United States Patent
Hong et al.

(10) Patent No.: US 11,762,576 B2
(45) Date of Patent: Sep. 19, 2023

(54) SEMICONDUCTOR MEMORY DEVICE AND OPERATING METHOD FOR REPAIRING GUARANTEE BLOCKS

(71) Applicant: SK hynix Inc., Icheon-si (KR)

(72) Inventors: Yong Hwan Hong, Icheon-si (KR); Byung Ryul Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 299 days.

(21) Appl. No.: 17/147,996

(22) Filed: Jan. 13, 2021

(65) Prior Publication Data

US 2022/0066685 A1 Mar. 3, 2022

(30) Foreign Application Priority Data

Aug. 28, 2020 (KR) .......................... 10-2020-0109261

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 3/0619; G06F 3/064
See application file for complete search history.

(56) References Cited

U.S. PATENT DOCUMENTS

| | | | | |
|---|---|---|---|---|
| 9,490,013 B1* | 11/2016 | Park | ...................... | G11C 29/787 |
| 9,766,990 B1* | 9/2017 | Michaud | ............. | G06F 12/0246 |
| 2021/0303424 A1* | 9/2021 | Jain | ........................ | G06F 3/0679 |

FOREIGN PATENT DOCUMENTS

| KR | 100806343 B1 | 2/2008 |
|---|---|---|
| KR | 1020170043296 A | 4/2017 |

* cited by examiner

*Primary Examiner* — Jane W Benner
(74) *Attorney, Agent, or Firm* — WILLIAM PARK & ASSOCIATES LTD.

(57) ABSTRACT

According to an embodiment, a semiconductor memory device includes a plurality of memory blocks including first to m-th guarantee blocks, wherein m is an integer greater than 1; repair logic suitable for generating bad block information by detecting defective memory blocks among the first to m-th guarantee blocks, and determining first to m-th offset values respectively corresponding to the first to m-th guarantee blocks based on the bad block information; and an address decoder suitable for generating a block selection address by reflecting an offset value selected from the first to m-th offset values onto a block address when the block address corresponds to any of the first to m-th guarantee blocks, and by reflecting the m-th offset value onto the block address when the block address corresponds to any of the memory blocks except for the first to m-th guarantee blocks.

16 Claims, 16 Drawing Sheets

FIG. 9A

| BLK_ADD | INDEX | BADBLK_CNT |
|---|---|---|
| 0 | 0 | 0 |
| +1 | 0 | +1 |

FIG. 9B

| BLK_ADD | INDEX | BADBLK_CNT |
|---|---|---|
| 0 | 0 | 0 |
| +1 | 0 | +1 |
| PRL_MAP[0] | | +1 |
| +2 | +1 | +1 |

FIG. 9C

| BLK_ADD | INDEX | BADBLK_CNT |
|---|---|---|
| 0 | 0 | 0 |
| +1 | 0 | +1 |
| PRL_MAP[0] | | +1 |
| +2 | +1 | +1 |
| +3 | +1 | +2 |

FIG. 9D

| BLK_ADD | INDEX | BADBLK_CNT |
|---|---|---|
| 0 | 0 | 0 |
| +1 | 0 | +1 |
| PRL_MAP[0] | | +1 |
| +2 | +1 | +1 |
| +3 | +1 | +2 |
| PRL_MAP[1] | | +2 |
| +4 | +2 | +2 |

FIG. 9E

| BLK_ADD | INDEX | BADBLK_CNT |
|---|---|---|
| 0 | 0 | 0 |
| +1 | 0 | +1 |
| PRL_MAP[0] | | +1 |
| +2 | +1 | +1 |
| +3 | +1 | +2 |
| PRL_MAP[1] | | +2 |
| +4 | +2 | +2 |
| PRL_MAP[2] | | +2 |
| +5 | +3 | +2 |

FIG. 9F

| BLK_ADD | INDEX | BADBLK_CNT |
|---|---|---|
| 0 | 0 | 0 |
| +1 | 0 | +1 |
| PRL_MAP[0] | | +1 |
| +2 | +1 | +1 |
| +3 | +1 | +2 |
| PRL_MAP[1] | | +2 |
| +4 | +2 | +2 |
| PRL_MAP[2] | | +2 |
| +5 | +3 | +2 |
| PRL_MAP[3] | | +2 |
| +6 | +4 | +2 |

SEMICONDUCTOR MEMORY DEVICE AND OPERATING METHOD FOR REPAIRING GUARANTEE BLOCKS

CROSS-REFERENCE TO RELATED APPLICATION

The present application claims priority of Korean Patent Application No. 10-2020-0109261, filed on Aug. 28, 2020, which is herein incorporated by reference in its entirety.

BACKGROUND

1. Technical Field

The disclosure relates to semiconductor design technology, and more specifically, to a block mapping method of a semiconductor memory device.

2. Related Art

With the surge in usage of mobile information devices using semiconductor memory devices as storage media, especially smartphones and tablets, these semiconductor memory devices have gained increasing interest and importance. The emergence of a wide range of applications as well as a high-speed processor or multi-core parallelism has required increased performance and reliability of semiconductor memory devices.

A semiconductor memory device is a storage device that is realized using a semiconductor made from, for example, silicon (Si), germanium (Ge), gallium arsenide (GaAs), or indium phosphide (InP). Semiconductor memory devices can be classified as volatile memory devices or nonvolatile memory devices. A volatile memory device is unable to retain stored data when the power is turned off. Volatile memory devices include static random access memory (SRAM) device, dynamic RAM (DRAM) device, synchronous DRAM (SDRAM) device, or the like. A non-volatile memory device can retain stored data even when powered off. Non-volatile memory devices may include read only memory (ROM) device, programmable ROM (PROM) device, electrically programmable ROM (EPROM) device, electrically erasable and programmable ROM (EEPROM) device, flash memory device, phase-change RAM (PRAM) device, magnetic RAM (MRAM) device, resistive RAM (RRAM) device, ferroelectric RAM (FRAM) device, or the like. A flash memory device may be classified as a NOR type or a NAND type.

A non-volatile memory device may include a plurality of memory blocks. Defective memory blocks among the plurality of memory blocks may be generated due to errors in the manufacturing process. A non-volatile memory device having a predetermined number or less defective memory blocks may be treated as a normal device.

However, there are specific memory blocks (hereinafter, referred to as guarantee blocks) that may store security data and might not be necessarily defective according to the customer's needs. Non-volatile memory devices having defects in the guarantee blocks may be treated as a failed device, regardless of the total number of defective memory blocks. This may result in reduced production yield of non-volatile memory devices.

SUMMARY

According to an embodiment, a semiconductor memory device may include a plurality of memory blocks including first to m-th guarantee blocks, wherein 'm' is an integer greater than 1; a repair logic suitable for generating bad block information by detecting defective memory blocks among the first to m-th guarantee blocks, and determining first to m-th offset values respectively corresponding to the first to m-th guarantee blocks based on the bad block information; and an address decoder suitable for generating a block selection address by reflecting an offset value selected from the first to m-th offset values onto a block address when the block address corresponds to any of the first to m-th guarantee blocks, and by reflecting the m-th offset value onto the block address when the block address corresponds to any of the memory blocks except for the first to m-th guarantee blocks.

According to an embodiment, a memory system may include a memory device including a plurality of memory blocks including first to m-th guarantee blocks, wherein 'm' is an integer greater than 1; and a controller suitable for providing an address including a block address, a command, and data to the memory device, wherein the memory device generates bad block information by detecting defective memory blocks among the first to m-th guarantee blocks, determines first to m-th offset values respectively corresponding to the first to m-th guarantee blocks based on the bad block information, and generates a block selection address by reflecting an offset value selected from the first to m-th offset values onto a block address when the block address corresponds to any of the first to m-th guarantee blocks, and by reflecting the m-th offset value onto the block address when the block address corresponds to any of the memory blocks except for the first to m-th guarantee blocks.

According to an embodiment, an operating method of a semiconductor memory device including a plurality of memory blocks including first to m-th guarantee blocks, wherein 'm' is an integer greater than 1, the method may include: determining whether any of the first to m-th guarantee blocks is defective, based on bad block information, and configuring fields of a repair mapping table by setting first to m-th offset values respectively corresponding to the first to m-th guarantee blocks according to a determination result; generating a block selection address according to an offset value selected from the first to m-th offset values by determining whether a block address corresponds to any of the first to m-th guarantee blocks; and selecting a memory block corresponding to the block selection address, from the memory blocks.

BRIEF DESCRIPTION OF THE DRAWINGS

FIGS. 9A, 9B, 9C, 9D, 9E, and 9F are diagrams describing a repair mapping table of FIG. 6 that is set by the offset calculation circuit.

DETAILED DESCRIPTION

Figure 1:
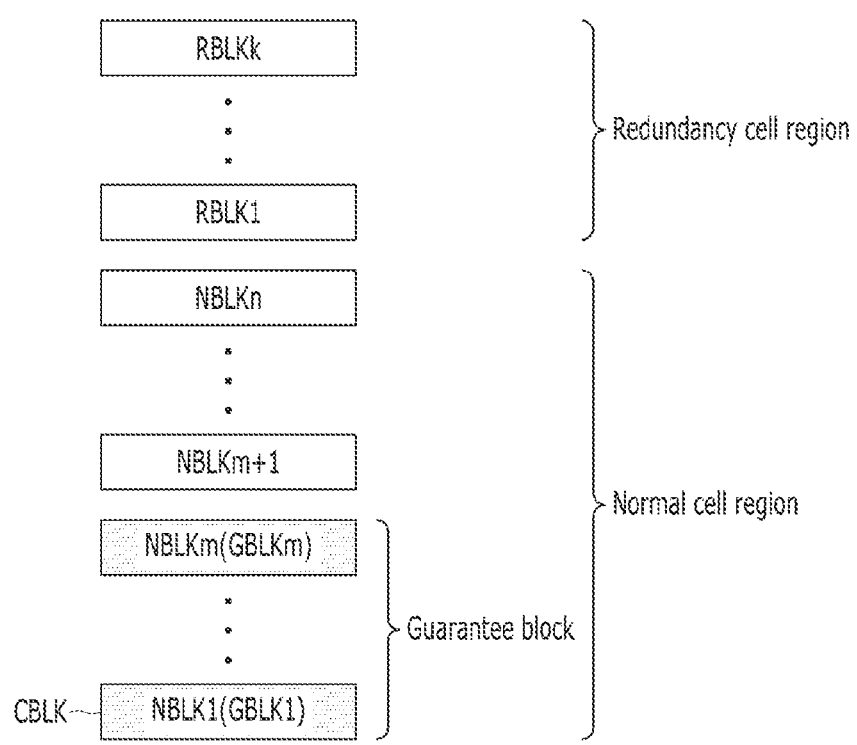
FIG. 1 is a configuration diagram illustrating a memory cell array of a semiconductor memory device.

Various embodiments are described below with reference to the accompanying drawings. The embodiments may, however, be embodied in different forms and thus should not be construed as limited to the embodiments set forth herein. Throughout the disclosure, like reference numerals refer to like parts throughout the various figures and embodiments of the present invention. It is noted that reference to "an embodiment," "another embodiment" or the like does not necessarily mean only one embodiment, and different references to any such phrase are not necessarily to the same embodiment(s). The term "embodiments" when used herein does not necessarily refer to all embodiments.

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without indicating any change in the element itself.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

According to embodiments, there are provided a semiconductor device for repairing guarantee blocks of a memory cell array, and an operating method of the semiconductor device.

According to the embodiments, in the semiconductor device, transistor characteristics may be accurately detected. Thus, it may be possible to enhance the characteristics of the semiconductor device manufactured.

According to the embodiments, in the semiconductor device, transistor characteristics may be accurately detected. Thus, it may be possible to reduce malfunctions even when the semiconductor device operates at high speed.

FIG. 1 is a configuration diagram illustrating a memory cell array 10 of a semiconductor memory device.

Referring to FIG. 1, the memory cell array 10 may include a plurality of memory blocks NBLK1 to NBLKn and RBLK1 to RBLKk, which are disposed in a normal cell region and a redundancy cell region.

In the normal cell region, a plurality of normal memory blocks NBLK1 to NBLKn may be disposed. The normal memory blocks NBLK1 to NBLKn may be used for storing normal data such as user data. In the redundancy cell region, a plurality of redundancy memory blocks RBLK1 to RBLKk may be disposed. The redundancy memory blocks RBLK1 to RBLKk may be used for repairing defective memory blocks among the normal memory blocks NBLK1 to NBLKn.

Specific blocks among the normal memory blocks NBLK1 to NBLKn may be allocated as guarantee blocks GBLK1 to GBLKm. The guarantee blocks GBLK1 to GBLKm may be used for storing security data, for example, identification (ID) information of the semiconductor memory device, such as the manufacturer's serial number and the manufacture date. The guarantee blocks GBLK1 to GBLKm may be one-time programmable (OTP) memory blocks, which are programmed with data once and the stored data is not lost.

At least one of the guarantee blocks GBLK1 to GBLKm may be composed of a content addressable memory (CAM) block CBLK. The CAM block CBLK may be used for storing setting information of the semiconductor memory device. For example, the CAM block CBLK may store repair information of the semiconductor memory device. The repair information may include information for designating defective memory blocks generated in the normal memory blocks NBLK1 to NBLKn as bad blocks and for allocating the redundancy memory blocks RBLK1 to RBLKk for the bad blocks. The repair information may be generated during a test period after the fabrication process of the semiconductor memory device, and may be stored in the CAM block CBLK. For instance, after the semiconductor memory device is fabricated in a wafer level and prior to a package process, the semiconductor memory device may be tested to determine whether defective memory blocks are present among the normal memory blocks NBLK1 to NBLKn, and the repair information may be stored in the CAM block CBLK based on the test result. The CAM block CBLK may store various voltage levels for operation, algorithm information, timing information, and defective column/row information, in addition to the repair information of the semiconductor memory device.

The normal memory blocks NBLK1 to NBLKn may be accessed by an external device (not shown). The semiconductor memory device may store data into the normal memory blocks NBLK1 to NBLKn, read data from the normal memory blocks NBLK1 to NBLKn, and erase data stored in the normal memory blocks NBLK1 to NBLKn, according to a request from the external device. The external device may provide, along with the data, a command, and an address for accessing the normal memory blocks NBLK1 to NBLKn, to the semiconductor memory device. The semiconductor memory device may generate a block address corresponding to the address when the command is input.

Even if the defective memory blocks are generated in the normal memory blocks NBLK1 to NBLKn, when the defective memory blocks take up a predetermined percentage or less, the semiconductor memory device may be designated as a normal device. As known, a defective memory block may be designated as a bad block and replaced by any one of the redundancy memory blocks RBLK1 to RBLKk. Alternatively, the defective memory block may be designated as an invalid block. On the other hand, when at least one defective memory block is generated in the guarantee blocks GBLK1 to GBLKm, as long as the corresponding defective memory block is not replaced by the redundancy memory blocks RBLK1 to RBLKk, the semiconductor memory device may be designated as an abnormal device. Thus, it is important to repair the defective memory block generated in the guarantee blocks GBLK1 to GBLKm, to increase the production yield of the semiconductor memory device. The word "predetermined" as used herein with respect to a parameter, such as a predetermined percentage, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 2:
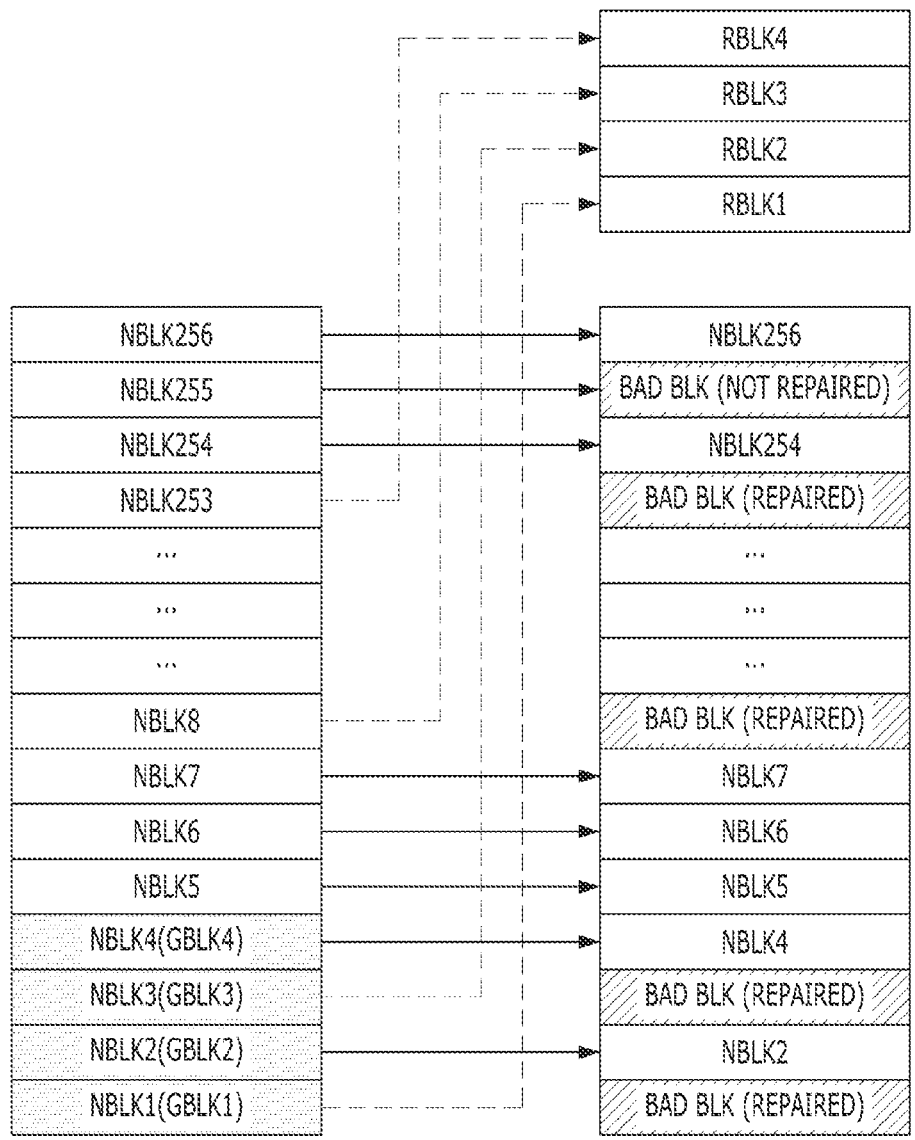
FIGS. 2A and 2B are diagrams describing a typical repair block mapping method.

FIGS. 2A and 2B are diagrams describing a typical repair block mapping method.

Referring to FIG. 2A, a case where first to 256th normal memory blocks NBLK1 to NBLK256, and first to fourth redundancy memory blocks RBLK1 to RBLK4 are disposed, and the first to fourth normal memory blocks NBLK1 to NBLK4 among the first to 256th normal memory blocks NBLK1 to NBLK256, are allocated as first to fourth guarantee blocks GBLK1 to GBLK4, is shown. It is assumed that the first normal memory block NBLK1, the third normal memory block NBLK3, the eighth normal memory block NBLK8, the 253th normal memory block NBLK253, and the 255th normal memory block NBLK255 are detected as defective memory blocks. In this case, the first to fourth redundancy memory blocks RBLK1 to RBLK4 may be respectively replaced with the first normal memory block NBLK1, the third normal memory block NBLK3, the eighth normal memory block NBLK8, and the 253th normal memory block NBLK253. The 255th normal memory block NBLK255 is not to be repaired.

Referring to FIG. 2B, a lookup-based repair mapping table for respectively mapping the defective memory blocks to the redundancy memory blocks RBLK1 to RBLK4, is shown. The repair mapping table may store each block address of the first normal memory block NBLK1, the third normal memory block NBLK3, the eighth normal memory block NBLK8, and the 253th normal memory block NBLK253, as a field value of each index. At this time, the number of fields (or indices) in the repair mapping table may be determined by the number (e.g., 4) of the redundancy memory blocks, and the bit width of each field may be determined by the size of the block address.

As described above, the typical repair block mapping is performed to first repair the defective memory blocks among the guarantee blocks GBLK1 to GBLK4. At this time, 5 defective memory blocks have occurred, but only 4 defective memory blocks can be replaced by the redundancy memory blocks RBLK1 to RBLK4. The 255th normal memory block NBLK255, which is the defective memory block but has not been replaced, is treated as an invalid block, so the semiconductor memory device may be treated as a normal device.

Figure 3:
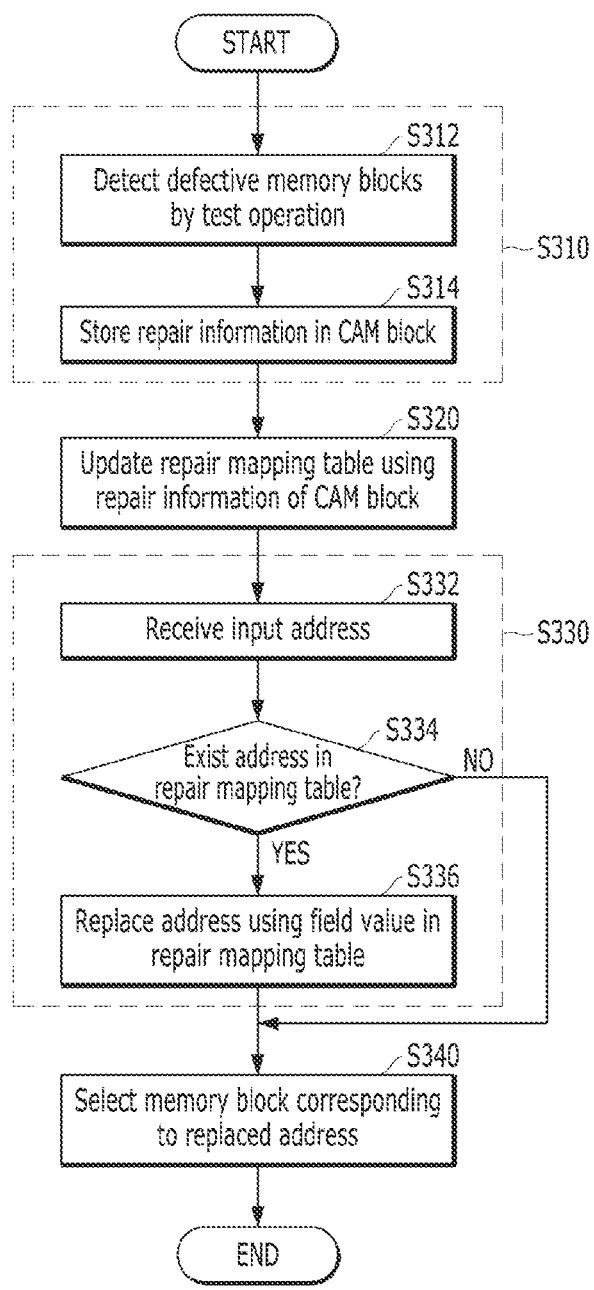
FIG. 3 is a flowchart illustrating the repair block mapping method of FIG. 2A.

FIG. 3 is a flowchart illustrating the repair block mapping method of FIG. 2A.

Referring to FIG. 3A, the repair information is detected by a test operation, and the detected repair information is stored in the CAM block CBLK (at S310). For example, the defective memory blocks may be detected by a wafer-level test operation (at S312). For example, assuming that the first normal memory block NBLK1, the third normal memory block NBLK3, the eighth normal memory block NBLK8, the 253th normal memory block NBLK253, and the 255th normal memory block NBLK255 are detected as the defective memory blocks, the repair information on the repairable memory blocks NBLK1, NBLK3, NBLK8, and NBLK253 may be generated as repair mapping information, and the information on the irrepairable memory block NBLK255 may be generated as bad block information. The mapping information and the bad block information may be stored in the CAM block CBLK as the repair information (at S314).

When an external power is applied to a semiconductor apparatus, the semiconductor apparatus may perform a boot-up or power-up operation. During the boot-up or power-up operation, a CAM read operation is performed. During the CAM read operation, data (i.e., repair information) stored in the CAM block CBLK may be read out to configure or update the repair mapping table as shown in FIG. 2B (at S320). When the block address is composed of 8-bit address, the bit width of each field has the 8-bit size.

During a normal operation such as the read/write/erase operation, the normal memory block or redundancy memory block corresponding to an input address may be accessed using the repair mapping table (at S330). For example, when an address is input from the external device (at S332), it is determined whether the input address exists in the repair mapping table (at S334). When the input address exists in the repair mapping table ("YES" of at S334), the input address is replaced by the field value of the repair mapping table (at S336). Accordingly, the redundancy memory block may be selected by the replaced address, instead of the defective memory block corresponding to the input address.

Meanwhile when the input address does not exist in the repair mapping table ("NO" of at S334), the normal memory block corresponding to the input address may be selected (at S340).

As described above, an operation time may be increased by storing the repair information in the separate CAM block and reading out the repair information through the CAM reading operation. In addition, the bit width constituting the field of the repair mapping table is allocated by the size of the block address, resulting in an increase in the size of the repair mapping table.

Hereinafter, in accordance with an embodiment, a repair block mapping method for reducing a size of a repair mapping table and a time to organize or update the repair mapping table while repairing guarantee blocks, will be explained.

Figure 4:
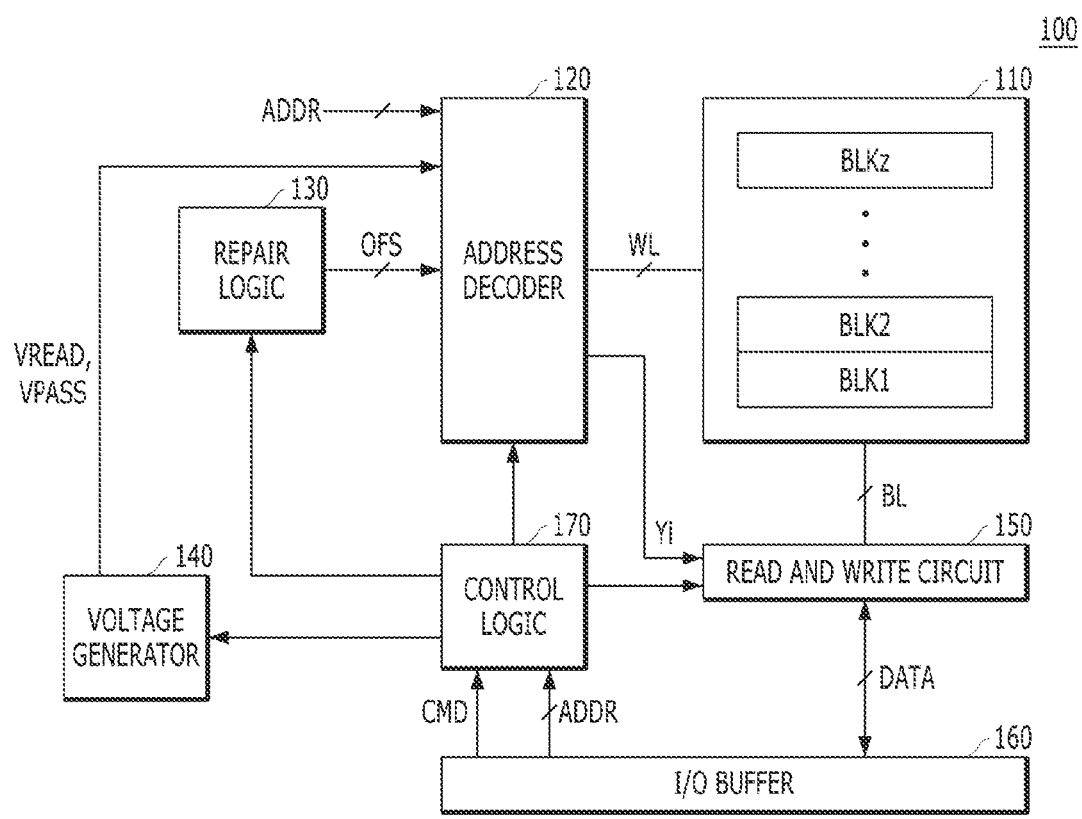
FIG. 4 is a block diagram illustrating a semiconductor memory device according to an embodiment.
Figure 5:
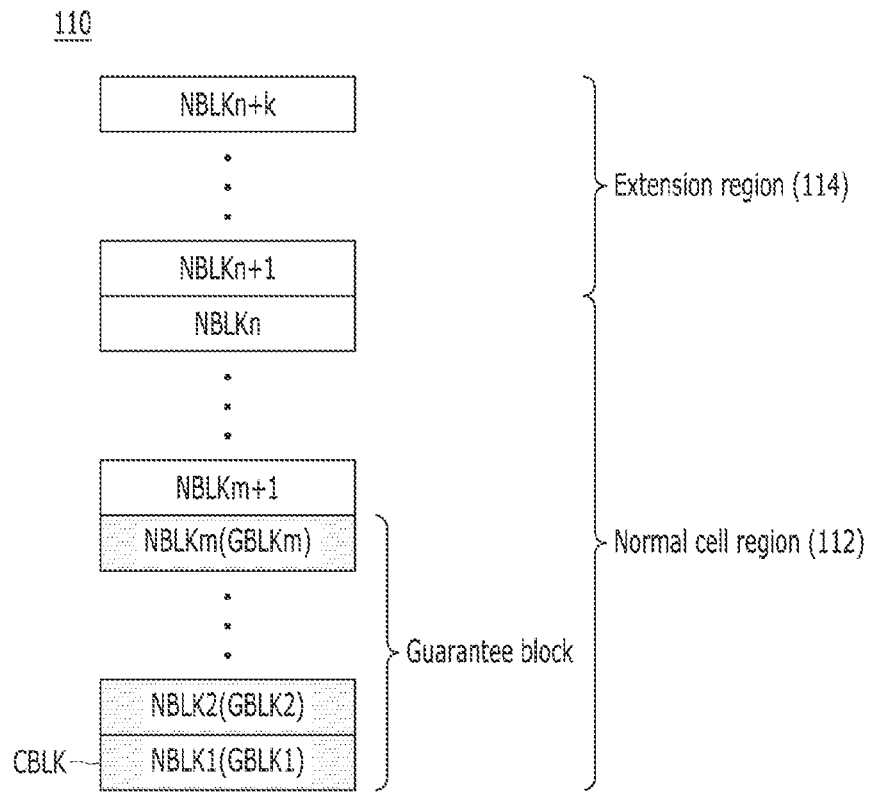
FIG. 5 is a configuration diagram illustrating a memory cell array of FIG. 4.

FIG. 4 is a block diagram illustrating a semiconductor memory device 100 according to an embodiment. FIG. 5 is a configuration diagram illustrating a memory cell array 110 of FIG. 4.

Referring to FIG. 4, the a semiconductor memory device 100 may include the memory cell array 110, an address decoder 120, repair logic 130, a voltage generator 140, a read and write circuit 150, an input/output (I/O) buffer 160 and control logic 170. The address decoder 120, the repair logic 130, the voltage generator 140, the read and write circuit 150, the input/output (I/O) buffer 160 and the control logic 170 may operate as a peripheral circuit for driving the memory cell array 110. The control logic 170 may be implemented as hardware, software, or a combination of hardware and software. For example, the control logic 170 may be a control logic circuit operating in accordance with an algorithm and/or a processor executing control logic code. The repair logic 130 may be implemented as hardware, software, or a combination of hardware and software. For example, the repair logic 170 may be a repair logic circuit operating in accordance with an algorithm and/or a processor executing repair logic code.

The memory cell array 110 may include a plurality of memory blocks BLK1 to BLKz. The memory blocks BLK1 to BLKz may be coupled to the address decoder 120 through a plurality of word lines WL. The memory blocks BLK1 to BLKz may be coupled to the read and write circuit 150 through a plurality of bit lines BL. Each of the memory blocks BLK1 to BLKz may include a plurality of memory cells. According to an embodiment, the plurality of memory cells may be non-volatile memory cells.

Referring to FIG. 5, the memory cell array 110 may include a normal cell region 112 and an extension region 114.

In the normal cell region 112, first to n-th normal memory blocks NBLK1 to NBLKn may be disposed. The normal memory blocks NBLK1 to NBLKn may be used for storing normal data such as user data. Specific blocks among the normal memory blocks NBLK1 to NBLKn may be allocated as first to m-th guarantee blocks GBLK1 to GBLKm. For example, the first to m-th normal memory blocks NBLK1 to NBLKm may allocated as the first to m-th guarantee blocks GBLK1 to GBLKm. At least one of the guarantee blocks GBLK1 to GBLKm may be composed of a content addressable memory (CAM) block CBLK. The CAM block CBLK may be used for storing setting information of the semiconductor memory device 100. For example, the CAM block CBLK may store repair information of the semiconductor memory device. In the embodiment, the CAM block CBLK may store bad block information without storing repair mapping information, among the repair information.

In the extension region 114, first to k-th extension memory blocks NBLKn+1 to NBLKn+k may be disposed. The extension memory blocks NBLKn+1 to NBLKn+k may be extendable to the normal memory blocks NBLK1 to NBLKn, according to offset information OFS provided from a repair mapping table (not shown) on the repair logic 130. That is, according to the offset information OFS, an address for designating the first to n-th normal memory blocks NBLK1 to NBLKn may be extended linearly to access the first to k-th extension memory blocks NBLKn+1 to NBLKn+k. An external device (e.g., a controller) may provide a command CMD and an address ADDR to the semiconductor memory device 100, to access the normal memory blocks NBLK1 to NBLKn and the extension memory blocks NBLKn+1 to NBLKn+k. that is, the external device may access the extension memory blocks NBLKn+1 to NBLKn+k by applying the address ADDR.

Referring back to FIG. 4, the address decoder 120 may be coupled to the memory blocks BLK1 to BLKz through the word lines WL. The address decoder 120 may be controlled by the control logic 170. The address decoder 120 may receive and decode a block address, a row address, and a column address included in the address ADDR through the I/O buffer 160. For reference, an erase operation of the semiconductor memory device 100 may be performed in units of memory blocks, and a read and write/program operation of the semiconductor memory device 100 may be performed in units of word lines. The address ADDR input during the read and write/program operation may include the block address, the row address, and the column address. The address decoder 120 may select at least one of the memory blocks BLK1 to BLKz based on the block address, and select at least one of word lines in the selected memory block according to the row address. The address decoder 120 may provide a column selection signal YI that is generated by decoding the column address, to the read and write circuit 150. The address decoder 120 may include a block decider, a row decoder, a column decoder, an address buffer and so on.

Further, the address decoder 120 may apply a read voltage VREAD to the selected word line of the selected memory block, and a pass voltage VPASS to the remaining non-selected word lines, during the read operation. In addition, the address decoder 120 may apply a verification voltage to the selected word line of the selected memory block, and the pass voltage VPASS to the non-selected word lines during a program verification operation.

According to the embodiment, the address decoder 120 may generate a block selection address by reflecting the offset information OFS onto the block address. The block selection address may be used to select any of the first to n-th normal memory blocks NBLK1 to NBLKn and the first to k-th extension memory blocks NBLKn+1 to NBLKn+k. For example, the block address provided from the external device may have a range for designating the first to n-th normal memory blocks NBLK1 to NBLKn, while the block selection address may have a range for designating the first to k-th extension memory blocks NBLKn+1 to NBLKn+k as well as the first to n-th normal memory blocks NBLK1 to NBLKn. The detailed configuration and operation of the address decoder 120 will be explained in FIG. 10.

The repair logic 130 may be controlled by the control logic 170. The repair logic 130 may generate and transfer the offset information OFS to the address decoder 120. The repair logic 130 may generate the bad block information by detecting defective memory blocks among the first to m-th guarantee blocks GBLK1 to GBLKm, and determine first to m-th offset values respectively corresponding to the first to m-th guarantee blocks GBLK1 to GBLKm, based on the bad block information. The repair logic 130 may provide the first to m-th offset values as the offset information OFS, to the address decoder 120. The detailed configuration and operation of the repair logic 130 will be explained in FIGS. 6 to 9F.

The voltage generator 140 may be controlled by the control logic 170. The voltage generator 140 may generate the read voltage VREAD and the pass voltage VPASS during the read operation. The voltage generator 140 may generate a plurality of voltages by regulating an external voltage or amplifying the external voltage by using a plurality of pumping capacitors. These voltages may be provided to the address decoder 120, the repair logic 130, the read and write circuit 150, the I/O buffer 160 and the control logic 170.

The read and write circuit 150 may be controlled by the control logic 170. The read and write circuit 150 may receive data through the I/O buffer 160, and write the data to memory cells of the selected word lines through the bit lines BL, during the write/program operation. The read and write circuit 150 may read out data from memory cells of the selected word lines through the bit lines BL, and output the read data to the I/O buffer 160, during the read operation. for example, the read and write circuit 150 may include page buffers (or page registers).

The I/O buffer 160 may be coupled to the address decoder 120, the read and write circuit 150, and the control logic 170. The I/O buffer 160 may be controlled by the control logic 170. The I/O buffer 160 may transfer the command CMD and the address ADDR from the external device to the control logic 170, and transfer the address ADDR from the external device to the address decoder 120. In addition, the I/O buffer 160 may transfer the data between the external device and the read and write circuit 150.

The control logic 170 may operate in response to the command CMD and the address ADDR input from the external device through the input/output buffer 160.

Hereinafter, referring to FIGS. 6 to 9F, the configuration and operation of the repair logic 130 will be explained.

Figure 6:
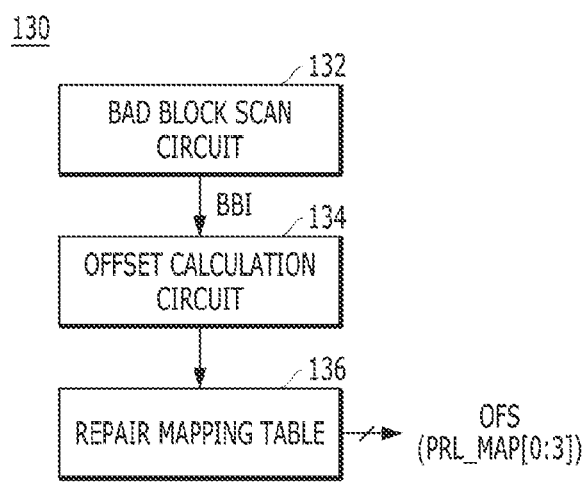
FIG. 6 is a block diagram illustrating a repair logic of FIG. 4.

FIG. 6 is a block diagram illustrating the repair logic 130 of FIG. 4.

Referring to FIG. 6, the repair logic 130 include a bad block scan circuit 132, an offset calculation circuit 134, and a repair mapping table 136.

The bad block scan circuit 132 may perform a CAM read operation during a boot-up or power-up operation to scan the bad block information BBI stored in the CAM block CBLK. The bad block scan circuit may provide the block information BBI to the offset calculation circuit 134. The bad block scan circuit 132 may operate by receiving a control signal from the control logic (170 of FIG. 4) during the boot-up or power-up operation.

The offset calculation circuit 134 may configure or update fields in the repair mapping table 136, using the bad block information BBI. The offset calculation circuit 134 may determine whether any of the first to m-th guarantee blocks GBLK1 to GBLKm is defective, based on the bad block information BBI. Depending on a result of the determination, the offset calculation circuit 134 may set first to m-th offset values PRL_MAP[0:m−1] respectively corresponding to the first to m-th guarantee blocks GBLK1 to GBLKm, and configure or update the repair mapping table 136 according to the first to m-th offset values PRL_MAP[0:m−1]. The offset calculation circuit 134 may calculate the first to m-th offset values PRL_MAP[0:m−1] by accumulatively counting the number of the defective memory blocks among the first to m-th guarantee blocks GBLK1 to GBLKm.

The repair mapping table 136 may store the first to m-th offset values PRL_MAP[0:m−1] into a field value of each index. The repair mapping table 136 may provide the stored field values as the offset information OFS. The number of fields (or indices) in the repair mapping table 136 may be determined by the number (i.e., m) of the first to m-th guarantee blocks GBLK1 to GBLKm, and, in particular, the bit width of each field may be determined according to the number (i.e., m) of the first to m-th guarantee blocks GBLK1 to GBLKm. For example, assuming that the number of the guarantee blocks is 4, the number of fields (or indices) in the repair mapping table 136 may be 4, and the bit width of each field may be set to 2-bit that is a log value of 4 (log 2^4). Accordingly, the size of the repair mapping table 136 may be significantly reduced since the bit width of each field of the repair mapping table of FIG. 2B becomes 8-bit (corresponding to the block address) while the bit width of each field of the repair mapping table 136 according to the embodiment becomes 2-bit.

Hereinafter, referring to FIGS. 7A to 9F, an operation of the offset calculation circuit 134 to configure the repair mapping table 136 will be explained as an example.

Figures 7A, 7B:
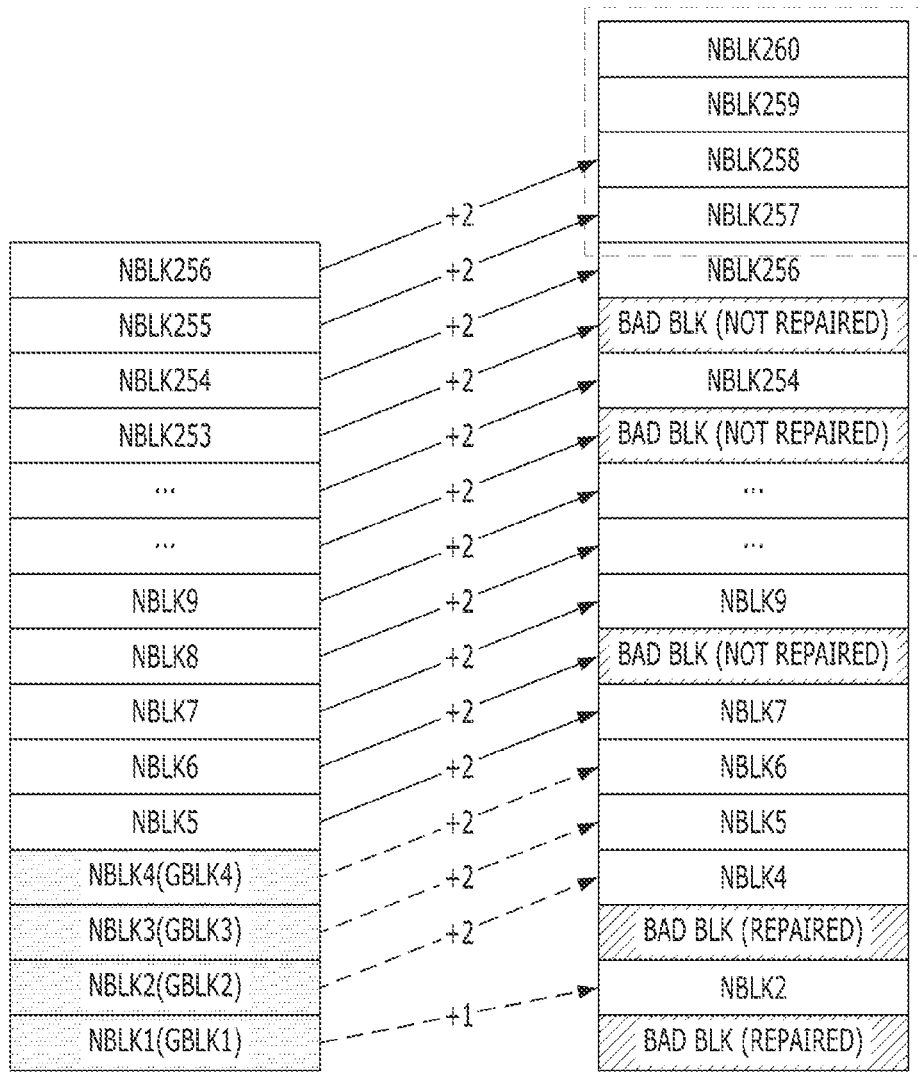
FIGS. 7A and 7B are diagrams describing a repair block mapping method according to an embodiment.
Figure 8:
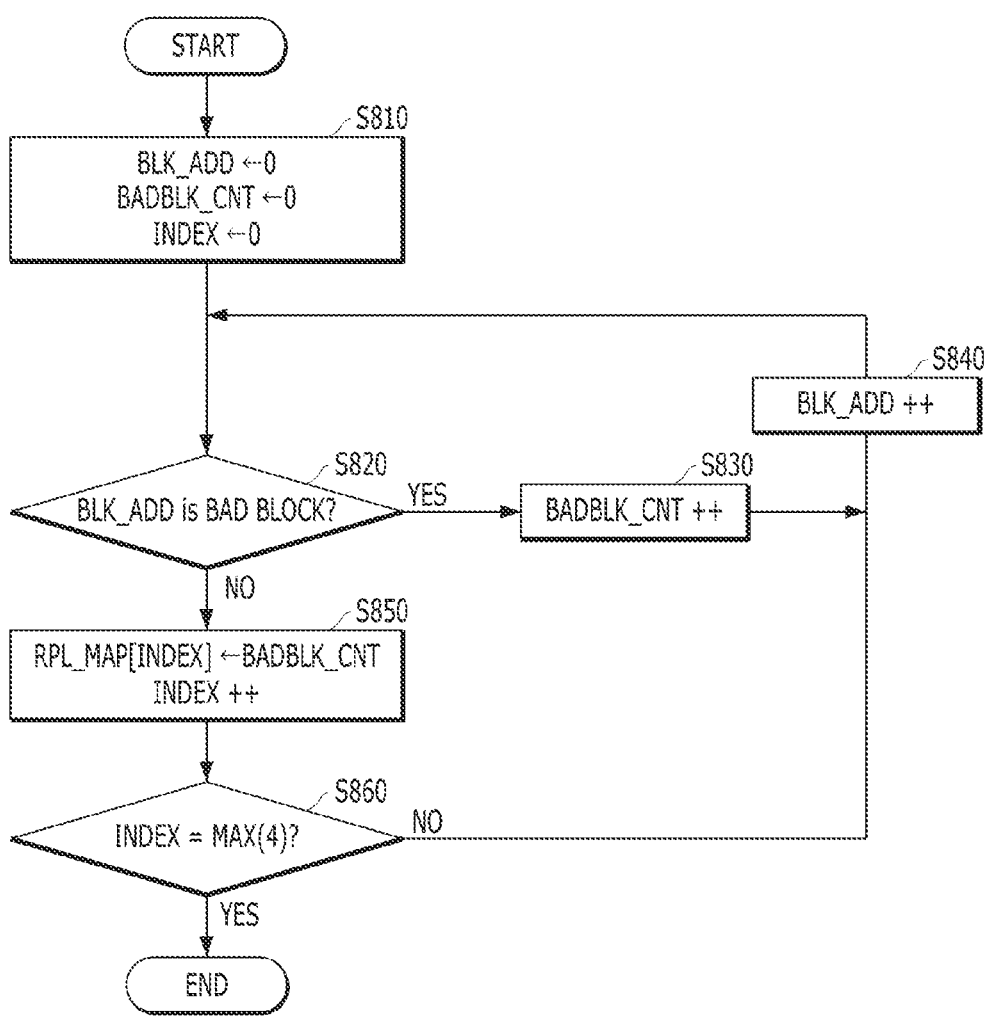
FIG. 8 is a flowchart illustrating an operation of an offset calculation circuit of FIG. 6.

FIGS. 7A and 7B are diagrams describing a repair block mapping method according to an embodiment. FIG. 8 is a flowchart illustrating an operation of the offset calculation circuit 134 of FIG. 6. FIGS. 9A to 9F are diagrams describing the repair mapping table 136 of FIG. 6 that is set by the offset calculation circuit 134.

Referring to FIG. 7A, a case where first to 256th normal memory blocks NBLK1 to NBLK256, first to fourth extension memory blocks NBLK257 to NBLK260, and the first to fourth normal memory blocks NBLK1 to NBLK4 among the first to 256th normal memory blocks NBLK1 to NBLK256, are allocated as first to fourth guarantee blocks GBLK1 to GBLK4, is shown. It is assumed that the first normal memory block NBLK1, the third normal memory block NBLK3, the eighth normal memory block NBLK8, the 253th normal memory block NBLK253, and the 255th normal memory block NBLK255 are detected as defective memory blocks.

Referring to FIG. 7B, the offset-based repair mapping table 136 is shown. The repair mapping table 136 may have 4 fields corresponding to the number of the first to fourth guarantee blocks GBLK1 to GBLK4. Each field may store a corresponding one of the first to fourth offset values PRL_MAP[0:3]. The repair mapping table 136 may provide the stored field values as the offset information OFS.

Referring to FIG. 8, the numeral reference "BLK_ADD" denotes a block index signal for sequentially designating the first to 256th normal memory blocks NBLK1 to NBLK256, the numeral reference "BADBLK_CNT" denotes a bad block count signal for counting the number of bad blocks, and the numeral reference "INDEX" denotes a field index signal for indicating the first to fourth offset values PRL_MAP[0:3].

The offset calculation circuit 134 may initialize all the block index signal BLK_ADD, the bad block count signal BADBLK_CNT, and the field index signal INDEX to "0" (at S810).

The offset calculation circuit 134 may determine whether a normal memory block corresponding to the block index signal BLK_ADD, among the first to 256th normal memory blocks NBLK1 to NBLK256, is a bad block or not, based on the bad block information BBI (at S820).

When the normal memory block corresponding to the block index signal BLK_ADD is a bad block ("YES" of S820), the offset calculation circuit 134 may increase the bad block count signal BADBLK_CNT by +1 (at S830), and increase the block index signal BLK_ADD by +1 (at S840). Then, the calculation circuit 134 may perform the operation at S820 again.

On the other hand, when the normal memory block corresponding to the block index signal BLK_ADD is a not a bad block ("NO" of S820), the offset calculation circuit 134 may assign the bad the block count signal BADBLK_CNT to an offset value PRL_MAP[INDEX] which is designated by the field index signal INDEX, among the first to fourth offset values PRL_MAP[0:3], and increase the field index signal INDEX by +1 (at S850). Thereafter, when the field index signal INDEX does not reach a maximum value "4" ("NO" of S860), the offset calculation circuit 134 may increase the block index signal BLK_ADD by +1 (at S840), and then perform the operation at S820 again. At this time, the maximum value of the field index signal INDEX may be determined by the number of the guarantee blocks GBLK1 to GBLK4.

The offset calculation circuit 134 may repeatedly perform the operations at S820 to S860 until the field index signal INDEX reaches the maximum value ("YES" of S860).

For example, referring to FIG. 9A, since the first normal memory block NBLK1 (i.e., the first guarantee block GBLK1) is a bad block ("YES" of S820), the offset calculation circuit 134 increases the bad block count signal BADBLK_CNT by +1 (at S830), and increases the block index signal BLK_ADD by +1 (at S840).

Referring to FIG. 9B, since the second normal memory block NBLK2 (i.e., the second guarantee block GBLK2) is not a bad block ("NO" of S820), the offset calculation circuit 134 assigns the bad the block count signal BADBLK_CNT "+1" to the first offset value PRL_MAP[0] among the first to fourth offset values PRL_MAP[0:3], and increases the field index signal INDEX by +1 (at S850). Thereafter, the offset calculation circuit 134 increases the block index signal BLK_ADD by +1 (at S840).

Referring to FIG. 9C, since the third normal memory block NBLK3 (i.e., the third guarantee block GBLK3) is a bad block ("YES" of S820), the offset calculation circuit 134 increases the bad block count signal BADBLK_CNT by +1 (at S830), and increases the block index signal BLK_ADD by +1 (at S840).

Referring to FIG. 9D, since the fourth normal memory block NBLK4 (i.e., the fourth guarantee block GBLK4) is not a bad block ("NO" of S820), the offset calculation circuit 134 assigns the bad the block count signal BADBLK_CNT "+2" to the second offset value PRL_MAP[1] among the first to fourth offset values PRL_MAP[0:3], and increases the field index signal INDEX by +1 (at S850). Thereafter, the offset calculation circuit 134 increases the block index signal BLK_ADD by +1 (at S840).

Referring to FIG. 9E, since the fifth normal memory block NBLK5 is not a bad block ("NO" of S820), the offset calculation circuit 134 assigns the bad the block count signal BADBLK_CNT "+2" to the third offset value PRL_MAP[2] among the first to fourth offset values PRL_MAP[0:3], and increases the field index signal INDEX by +1 (at S850). Thereafter, the offset calculation circuit 134 increases the block index signal BLK_ADD by +1 (at S840).

Referring to FIG. 9F, since the sixth normal memory block NBLK6 is not a bad block ("NO" of S820), the offset calculation circuit 134 assigns the bad the block count signal BADBLK_CNT "+2" to the fourth offset value PRL_MAP[3] among the first to fourth offset values PRL_MAP[0:3], and increases the field index signal INDEX by +1 (at S850).

Thereafter, since the field index signal INDEX reaches the maximum value ("YES" of S860), the offset calculation circuit 134 terminates the operation to configure or update the repair mapping table 136. Finally, the repair mapping table 136 may be configured as shown in FIG. 7B, and a repair block mapping method for repairing the guarantee blocks is performed based on the repair mapping table 136 as shown in FIG. 7A. That is, in accordance with the embodiment, the size of the repair mapping table 136 may be significantly reduced since the bit width of each field of the repair mapping table 136 is set to 2-bit.

Figure 10:
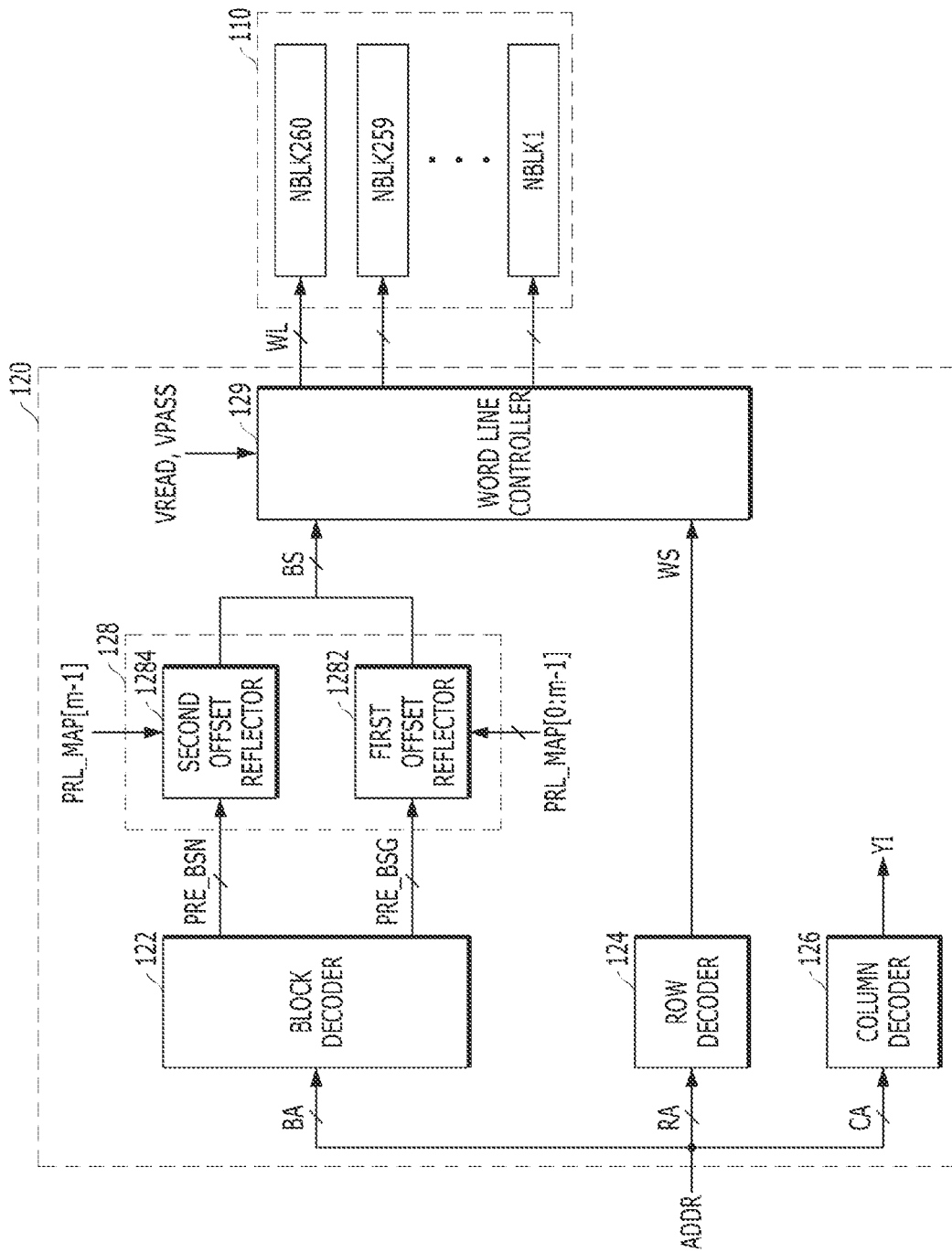
FIG. 10 is a detailed block diagram illustrating an address decoder of FIG. 4.

FIG. 10 is a detailed block diagram illustrating the address decoder 120 of FIG. 4.

Referring to FIG. 10, the address decoder 120 may include a block decoder 122, a row decoder 124, a column decoder 126, an offset reflection circuit 128, and a word line controller 129. The address decoder 120 may further include an address buffer (not shown) for transferring the address ADDR to the block decoder 122, the row decoder 124, and the column decoder 126.

The block decoder 122 may receive a block address BA among the address ADDR. The block decoder 122 may decode the block address BA to generate first and second preliminary addresses PRE_BSG and PRE_BSN for selecting any of the first to n-th normal memory blocks NBLK1 to NBLKn. In particular, when the block address BA corresponds to any of the first to m-th guarantee blocks GBLK1 to GBLKm, the block decoder 122 may generate the first preliminary address PRE_BSG. When the block address BA corresponds to any of the m+1-th to n-th normal memory blocks NBLKm+1 to NBLKn, except for the first to m-th guarantee blocks GBLK1 to GBLKm, the block decoder 122 may generate the second preliminary address PRE_BSN.

The row decoder 124 may receive a row address RA among the address ADDR. The row decoder 124 may decode the row address RA to generate a row selection signal WS for selecting any of the word lines WL.

The column decoder 126 may receive a column address CA among the address ADDR. The column decoder 126 may decode the column address CA to generate a column selection signal YI for selecting any of the bit lines BL.

The offset reflection circuit 128 may include a first offset reflector 1282 for receiving the first preliminary address PRE_BSG, and a second offset reflector 1284 for receiving the second preliminary address PRE_BSN.

The first offset reflector 1282 may generate a block selection address BS by reflecting an offset value selected from the first to m-th offset values PRL_MAP[0:m−1] onto the first preliminary address PRE_BSG, when the first preliminary address PRE_BSG is input. For example, as shown in FIGS. 7A and 7B, when the first preliminary address PRE_BSG corresponding to the first guarantee block GBLK1 is input, the first offset reflector 1282 generates the block selection address BS for selecting the second normal memory block NBLK2 by adding the first offset value PRL_MAP[0]"+1" to the first preliminary address PRE_BSG. Likewise, when the first preliminary address PRE_BSG corresponding to the second guarantee block GBLK2 is input, the first offset reflector 1282 generates the block selection address BS for selecting the fourth normal memory block NBLK4 by reflecting the second offset value PRL_MAP[1]"+2" onto the first preliminary address PRE_BSG.

The second offset reflector 1284 may generate the block selection address BS by reflecting the m-th offset values PRL_MAP[m−1] onto the second preliminary address PRE_BSN, when the second preliminary address PRE_BSN is input. For example, as shown in FIGS. 7A and 7B, when the second preliminary address PRE_BSN corresponding to any of the fifth to 256th normal memory blocks NBLK5 to NBLK256 is input, the second offset reflector 1284 generates the block selection address BS by identically adding the fourth offset value PRL_MAP[3] "+2" to the second preliminary address PRE_BSN. Accordingly, the 255th normal memory block NBLK255 and the 256th normal memory block NBLK256 may be designated to the first and second extension memory blocks NBLK257 and NBLK258.

The word line controller 129 may select any of the normal memory blocks NBLK1 to NBLKn and the extension memory blocks NBLKn+1 to NBLKn+k, according to the block selection address BS. The word line controller 129 may select any of word lines included in the selected block according to the row selection signal WS. The word line controller 129 may apply the read voltage VREAD, the pass voltage VPASS, and the verification voltage to the selected word line or remaining non-selected word lines.

As described above, the address decoder 120 may generate the block selection address BS by reflecting an offset value selected from the first to m-th offset values PRL_MAP[0:m−1] onto the block address BA when the block address BA corresponds to any of the first to m-th guarantee blocks GBLK1 to GBLKm is input. on the other hand, the address decoder 120 may generate the block selection address BS by reflecting the final m-th offset value PRL_MAP[m−1] onto the block address BA when the block address BA corresponds to any of the m+1-th to n-th normal memory blocks NBLKm+1 to NBLKn, except for the first to m-th guarantee blocks GBLK1 to GBLKm.

Figure 11:
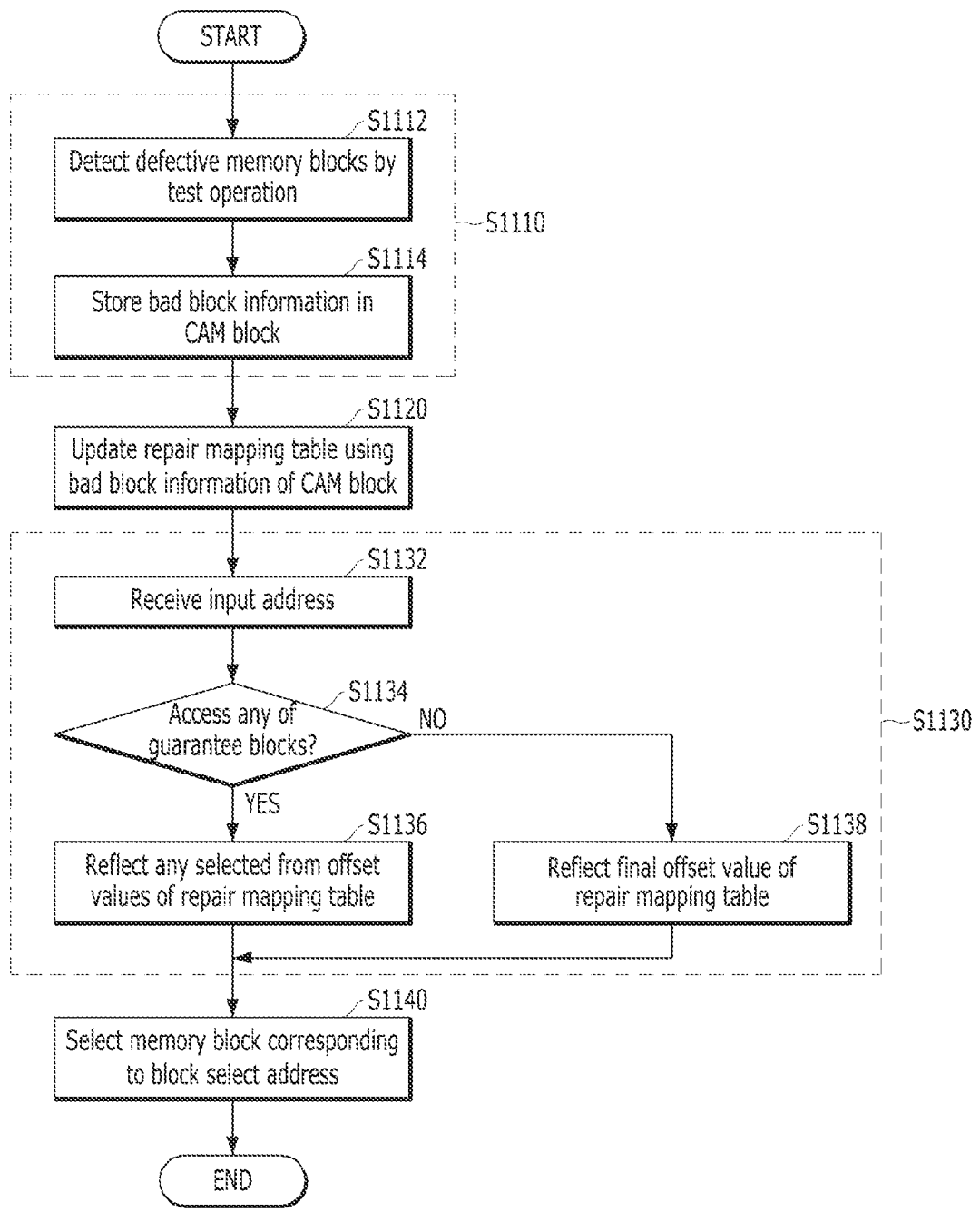
FIG. 11 is a flowchart illustrating a repair block mapping method according to an embodiment.

FIG. 11 is a flowchart illustrating a repair block mapping method according to an embodiment.

Referring to FIG. 11, the repair information is detected by a test operation, and the bad block information of the detected repair information is stored in the CAM block CBLK (at S1110). For example, the defective memory blocks may be detected by a wafer-level test operation (at S1112). As shown in FIG. 7A, the first normal memory block NBLK1, the third normal memory block NBLK3, the eighth normal memory block NBLK8, the 253th normal memory block NBLK253, and the 255th normal memory block NBLK255 are detected as the defective memory blocks, the repair information on the defective memory blocks NBLK1, NBLK3, NBLK8, NBLK253, and NBLK255 may be generated as the bad block information. The bad block information may be stored in the CAM block CBLK (at S1114).

During a boot-up or power-up operation, a CAM read operation is performed. During the CAM read operation, the bad block information BBI stored in the CAM block CBLK may be read out to configure or update the repair mapping table 136 as shown in FIG. 7B (at S1120). At this time, since only the bad block information BBI excluding the repair mapping information of the repair information is stored in the CAM block CBLK, it is possible to reduce the size of the CAM block CBLK and a time to perform the CAM read operation.

For example, the bad block scan circuit 132 may scan the bad block information BBI stored in the CAM block CBLK. The offset calculation circuit 134 may determine whether any of the first to m-th guarantee blocks GBLK1 to GBLKm is defective, based on the bad block information BBI, to thereby set the first to m-th offset values PRL_MAP[0:m−1] respectively corresponding to the first to m-th guarantee blocks GBLK1 to GBLKm, and configure or update the repair mapping table 136, as illustrated in FIGS. 8 to 9F. The repair mapping table 136 may provide the stored field values as the offset information OFS. At this time, the bit width of each field may be determined according to the number (i.e., m) of the first to m-th guarantee blocks GBLK1 to GBLKm. For example, assuming that the number of the guarantee blocks is 4, the bit width of each field may be set to 2-bit and thus the size of the repair mapping table 136 may be significantly reduced.

During a normal operation, when the address ADDR is input, the address decoder 120 may access any of the normal memory blocks NBLK1 to NBLKn and the extension memory blocks NBLKn+1 to NBLKn+k, using the repair mapping table 136 (at S1130). For example, when the address ADDR is input from the external device (at S1132), it is determined whether the block address BA of the address ADDR corresponds to any of the first to m-th guarantee blocks GBLK1 to GBLKm (at S1134). When the block address BA of the address ADDR corresponds to any of the first to m-th guarantee blocks GBLK1 to GBLKm ("YES" at S1134), the address decoder 120 may generate the block selection address BS by reflecting an offset value selected from the first to m-th offset values PRL_MAP[0:m−1] onto the block address BA (at S1136). On the other hand, when the block address BA of the address ADDR corresponds to any of the m+1-th to n-th normal memory blocks NBLKm+1 to NBLKn, except for the first to m-th guarantee blocks GBLK1 to GBLKm ("NO" at S1134), the address decoder 120 may generate the block selection address BS by reflecting the final m-th offset value PRL_MAP[m−1] onto the block address BA (at S1138).

The address decoder 120 may select any of the normal memory blocks NBLK1 to NBLKn and the extension memory blocks NBLKn+1 to NBLKn+k, according to the block selection address BS (at S1140). The address decoder 120 may 129 may select any of word lines included in the selected block according to the row selection signal WS, and apply the read voltage VREAD, the pass voltage VPASS, and the verification voltage to the selected word line or remaining non-selected word lines.

Figure 12A:
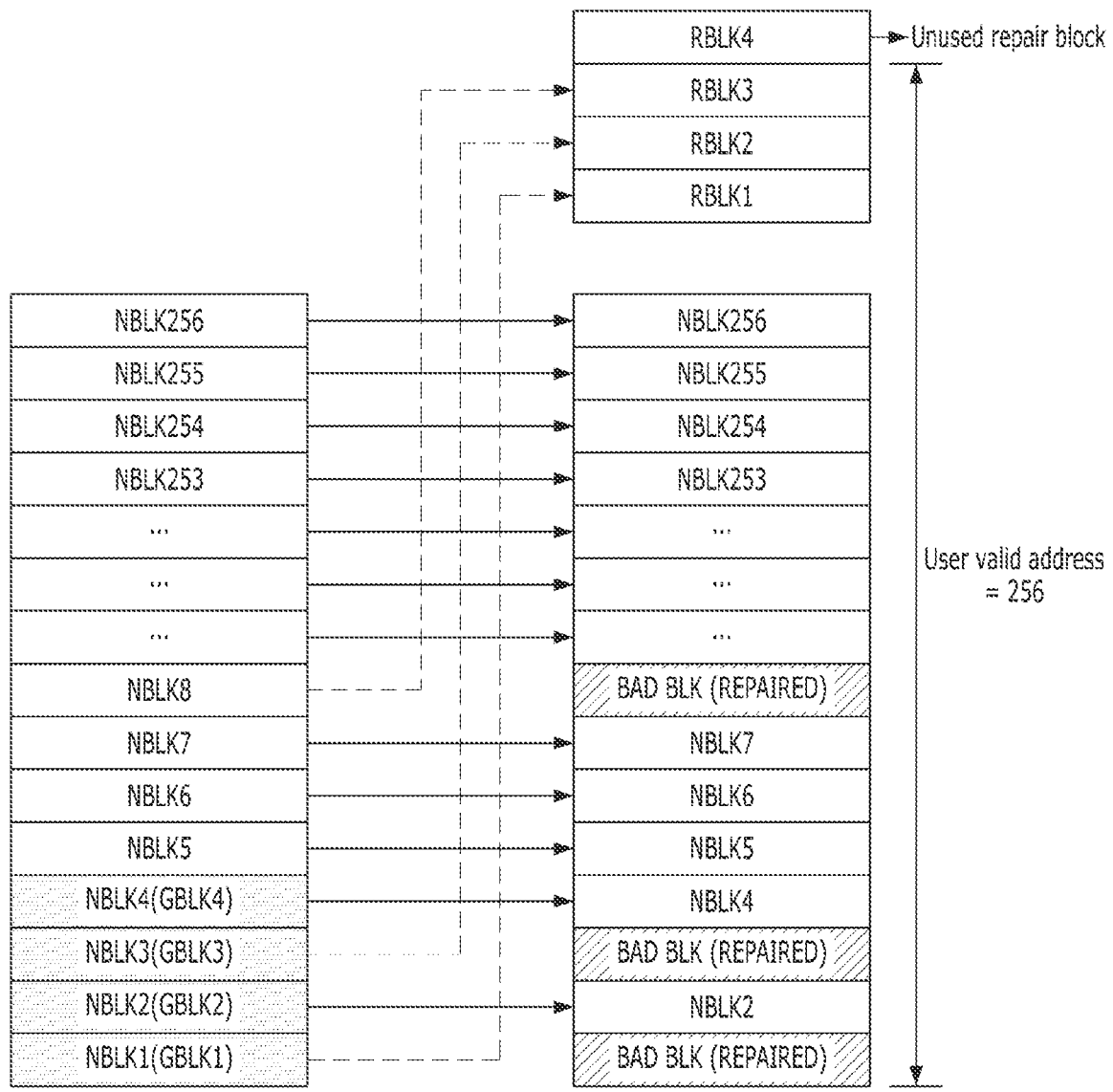
FIGS. 12A and 12B are diagrams to compare the typical repair block mapping method with the repair mapping method according to the embodiment.
Figure 12B:
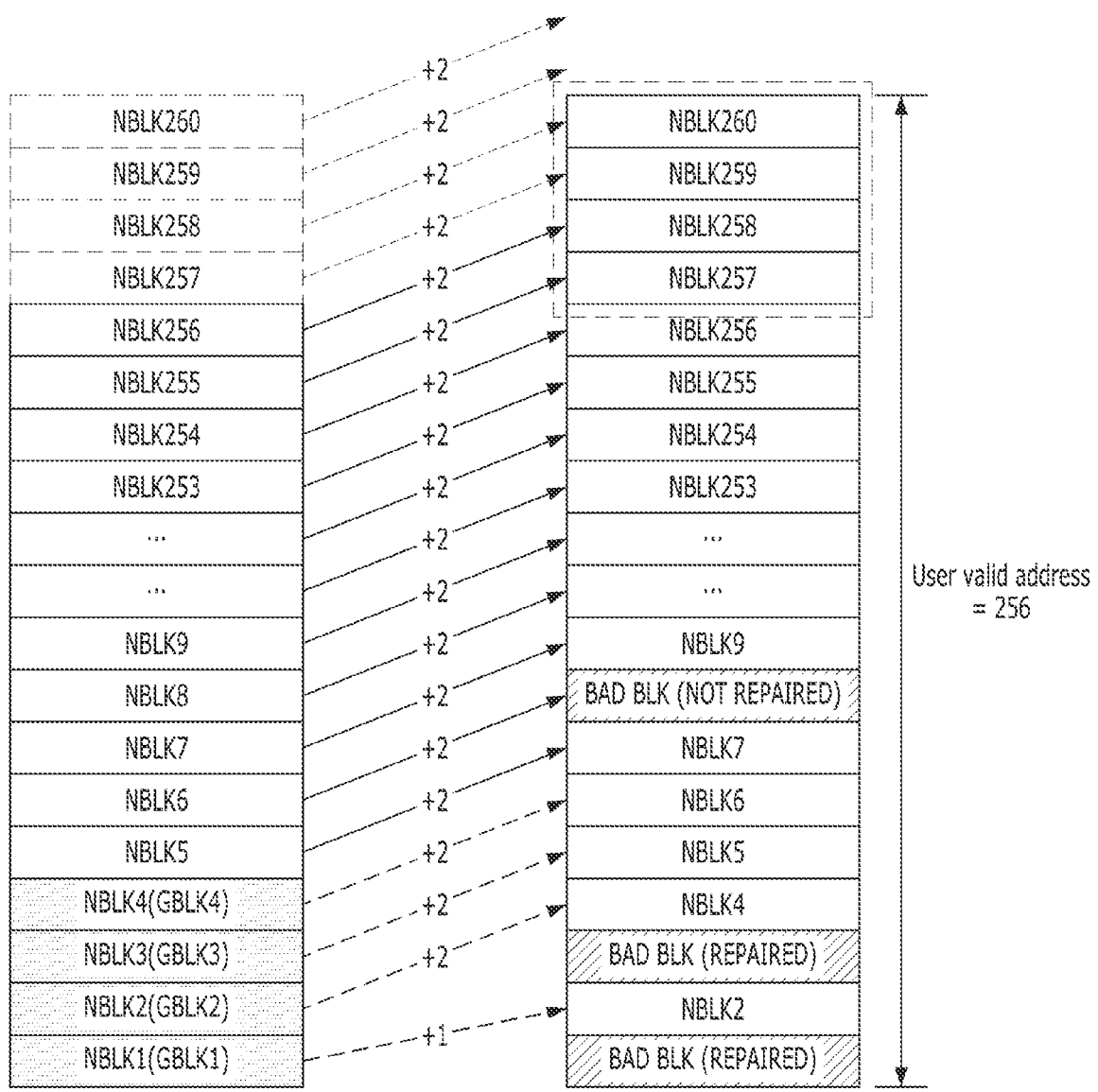

FIGS. 12A and 12B are diagrams to compare the typical repair block mapping method with the repair mapping method according to the embodiment.

Referring to FIG. 12A, a case where first to 256th normal memory blocks NBLK1 to NBLK256, and first to fourth redundancy memory blocks RBLK1 to RBLK4 are disposed. It is assumed that the first normal memory block NBLK1, the third normal memory block NBLK3, and the eighth normal memory block NBLK8 are detected as defective memory blocks. According to the typical repair block mapping method, an external device cannot directly access the first to fourth redundancy memory blocks RBLK1 to RBLK4. Accordingly, the maximum number of the memory blocks, which is accessible by the external devices, is 256 by adding the number of the normal memory blocks (i.e., 253) except for 3 defective memory blocks from 256 normal memory blocks, to the number of the redundancy memory blocks (i.e., 3) used to repair the defective memory blocks. That is, the external device may access only the remaining redundancy blocks RBLK1 to RBLK3, except for the irrepairable redundancy blocks RBLK4 among the first to fourth redundancy memory blocks RBLK1 to RBLK4.

Referring to FIG. 12B, a case where first to 256th normal memory blocks NBLK1 to NBLK256, first to fourth extension memory blocks NBLK257 to NBLK260, and the first to fourth normal memory blocks NBLK1 to NBLK4 among the first to 256th normal memory blocks NBLK1 to NBLK256, are allocated as first to fourth guarantee blocks GBLK1 to GBLK4, is shown. It is assumed that the first normal memory block NBLK1, the third normal memory block NBLK3, and the eighth normal memory block NBLK8 are detected as defective memory blocks. According to the repair mapping method in accordance with the embodiment, an external device may access the extension memory blocks NBLK257 to NBLK260. For example, by reflecting the offset values onto the defective memory blocks (i.e., the first guarantee block GBLK1 and the third guarantee block GBLK3) among the first to fourth guarantee blocks GBLK1 to GBLK4, an address for designating the first to 256th normal memory blocks NBLK1 to NBLK256 may be extended linearly to access the first and second extension memory blocks NBLK257 and NBLK258. At this time, when the external device knows information on the unused extension memory blocks NBLK259 and NBLK260, the external device may provide the address for designating the third and fourth extension memory blocks NBLK259 and NBLK260, to the memory device. Accordingly, the maximum number of the memory blocks, which is accessible by the external devices, is 257 by adding the number of the normal memory blocks (i.e., 253) except for 3 defective memory blocks from 256 normal memory blocks, to the number of the extension memory blocks (i.e., 4). As a result, according to the embodiment, it is possible to provide more effective blocks to the customers.

According to an embodiment, the external device may recognize that the memory device includes first to 260th normal memory blocks NBLK1 to NBLK260, and provide an address corresponding thereto. At this time, the memory device may process the third and fourth extension memory blocks NBLK259 and NBLK260 as invalid blocks, when receiving the address for designating the third and fourth extension memory blocks NBLK259 and NBLK260.

According to an embodiment, the external device may be a memory controller. The memory controller may perform a logical-to-physical (L2P) operation for receiving a logical address from a host and converting it as a physical address, and provide the physical address to the memory device. The memory device may receive the physical address and perform a repair block mapping operation. According to an embodiment, memory device may perform a L2P operation after receiving a logical address, and perform a repair block mapping operation.

Figure 13:
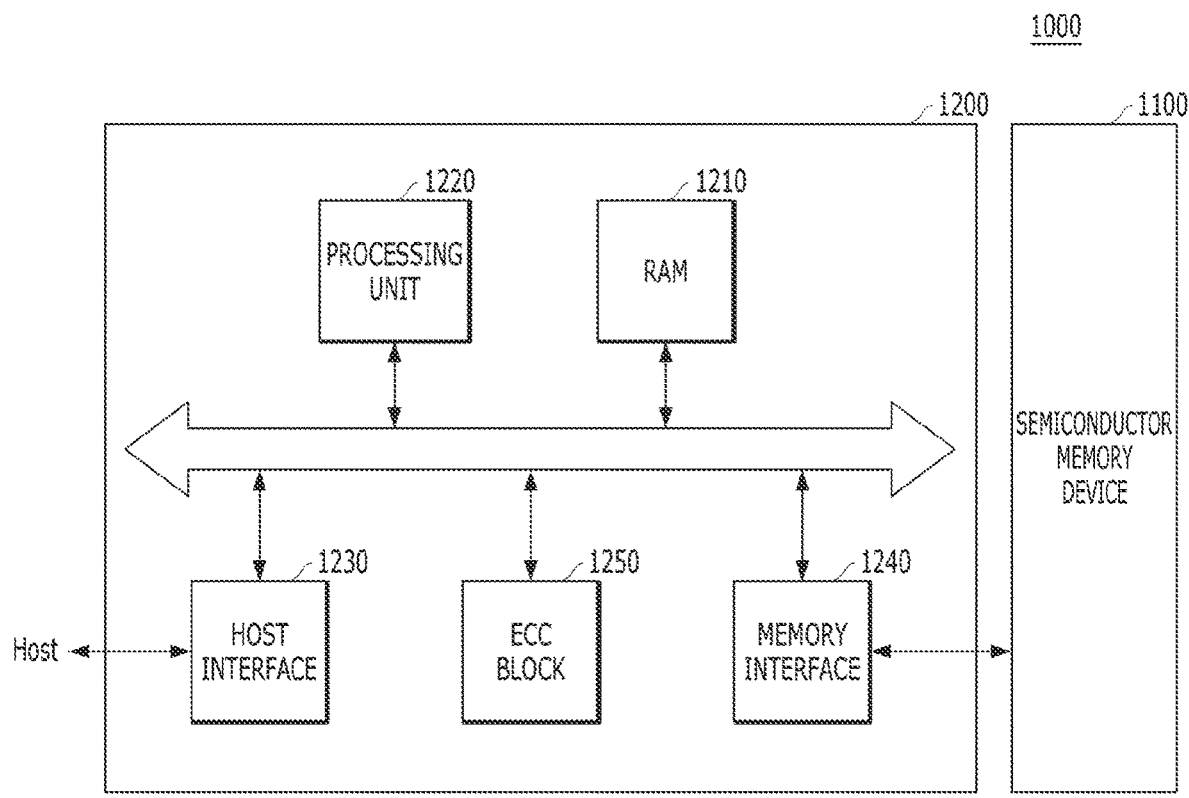
FIG. 13 is a block diagram illustrating a memory system including the semiconductor memory device shown in FIG. 4.

FIG. 13 is a block diagram illustrating a memory system 1000 including the semiconductor memory device 100 shown in FIG. 4.

Referring to FIG. 13, the memory system 1000 may include a semiconductor memory device 1100 and a controller 1200.

The semiconductor memory device 1100 may be configured and operated in substantially the same manner as described above with reference to FIG. 4. Thus, a detailed description thereof will be omitted.

The controller 1200 may be coupled to a host and the semiconductor memory device 1100. The controller 1200 may access the semiconductor memory device 1100 in response to a request from the host. For example, the memory controller 1200 may control read, write, erase and background operations of the semiconductor memory device 1100. The controller 1200 may provide an interface between the semiconductor memory device 1100 and the host. The controller 1200 may drive firmware for controlling the semiconductor memory device 1100.

The controller 1200 may include random access memory (RAM) 1210, a processing unit 1220, a host interface 1230, a memory interface 1240 and an error correcting code block 1250. The RAM 1210 may function as one source of operation memory of the processing unit 1220, a cache memory between the memory device 200 and the host, and a buffer memory between the semiconductor memory device 1100 and the host. The processing unit 1220 may control the general operation of the controller 1200.

The host interface 1230 may include a protocol for data exchange between the host and the controller 1200. According to an exemplary embodiment, the controller 1200 may be configured to communicate with the host through one of various interface protocols including Universal Serial Bus (USB) protocol, multimedia card (MMC) protocol, peripheral component interconnection (PCI) protocol, PCI-express (PCI-E) protocol, Advanced Technology Attachment (ATA) protocol, Serial-ATA protocol, Parallel-ATA protocol, small computer small interface (SCSI) protocol, enhanced small disk interface (ESDI) protocol, Integrated Drive Electronics (IDE) protocol and private protocol.

The memory interface 1240 may include a protocol for communication with the semiconductor memory device 1100. For example, the memory interface 1240 may include at least one of flash interfaces, such as a NAND interface and a NOR interface.

The ECC block 1250 may detect an error in data from the semiconductor memory device 1100 by using an error correcting code (ECC).

The controller 1200 and the semiconductor memory device 1100 may be integrated into a single semiconductor device. In an example of an embodiment, the controller 1200 and the semiconductor memory device 1100 may be integrated into a single semiconductor device to form a memory card. For example, the controller 1200 and the semiconductor memory device 1100 may be integrated into a single semiconductor device to form a PC card (personal computer memory card international association (PCMCIA)), a compact flash (CF) card, a smart media card (SM or SMC), a memory stick, a multimedia card (MMC, RS-MMC or MMCmicro), an SD card (SD, miniSD, microSD or SDHC), or universal flash storage (UFS).

The controller 1200 and the semiconductor memory device 1100 may be integrated into a single semiconductor device to form a semiconductor drive (Solid State Drive (SSD)). The semiconductor drive (SSD) may include a storage device configured to store data in a semiconductor memory. When the memory system 1000 is used as the semiconductor drive (SSD), an operating speed of the host coupled to the memory system 1000 may be significantly improved.

In another example, the memory system 1000 may be used as one of various components of an electronic device, such as a computer, an ultra mobile PC (UMPC), a workstation, a net-book, personal digital assistants (PDAs), a portable computer, a web tablet, a wireless phone, a mobile phone, a smart phone, an e-book, a portable multimedia player (PMP), a portable game machine, a navigation device, a black box, a digital camera, a three-dimensional (3D) television, a digital audio recorder, a digital audio player, a digital picture recorder, a digital picture player, a digital video recorder, a digital video player, a device for transmitting/receiving information in wireless environment, one of various electronic devices for home network, one of various electronic devices for computer network, one of various electronic devices for telematics network, an RFID device and/or one of various devices for computing systems, etc.

In an example of an embodiment, the semiconductor memory device 1100 or the memory system 1000 may be packaged in a variety of ways. For example, the semiconductor memory device 1100 or the memory system 1000 may be packaged using various methods such as package on package (PoP), ball grid arrays (BGAs), chip scale packages (CSPs), plastic leaded chip carrier (PLCC), plastic dual in line package (PDIP), die in waffle pack, a die in wafer form, a chip on board (COB), ceramic dual in line package (CERDIP), plastic metric quad flat pack (MQFP), thin quad flatpack (TQFP), small outline (SOIC), shrink small outline package (SSOP), thin small outline (TSOP), thin quad flatpack (TQFP), system in package (SIP), multi chip package (MCP), wafer-level fabricated package (WFP) and/or wafer-level processed stack package (WSP), etc.

Figure 14:
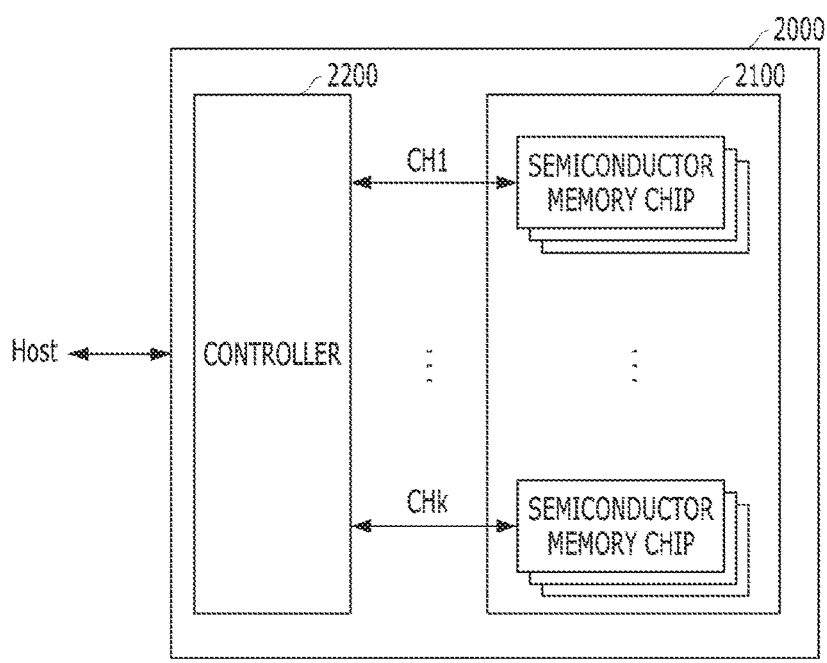
FIG. 14 is a block diagram illustrating an application example of the memory system shown in FIG. 13.

FIG. 14 is a block diagram illustrating an application example of the memory system 1000 shown in FIG. 13.

Referring to FIG. 14, a memory system 2000 may include a semiconductor memory device 2100 and a controller 2200. The semiconductor memory device 2100 may include a plurality of semiconductor memory chips. The semiconductor memory chips may be divided into a plurality of groups.

FIG. 14 illustrates the plurality of groups communicating with the controller 2200 through first to k-th channels CH1 to CHk, respectively. Each of the memory chips may be configured and operated in substantially the same manner as the semiconductor memory device 100 described above with reference to FIG. 4.

Each of the groups may communicate with the controller 2200 through a single common channel. The controller 2200 may be configured in substantially the same manner as the controller 1200 as described above with reference to FIG. 13 and may control the plurality of memory chips of the semiconductor memory device 2100.

FIG. 14 illustrates the plurality of semiconductor memory chips coupled to a single channel. However, the memory system 2000 may be modified so that a single semiconductor memory chip may be coupled to a single channel.

Figure 15:
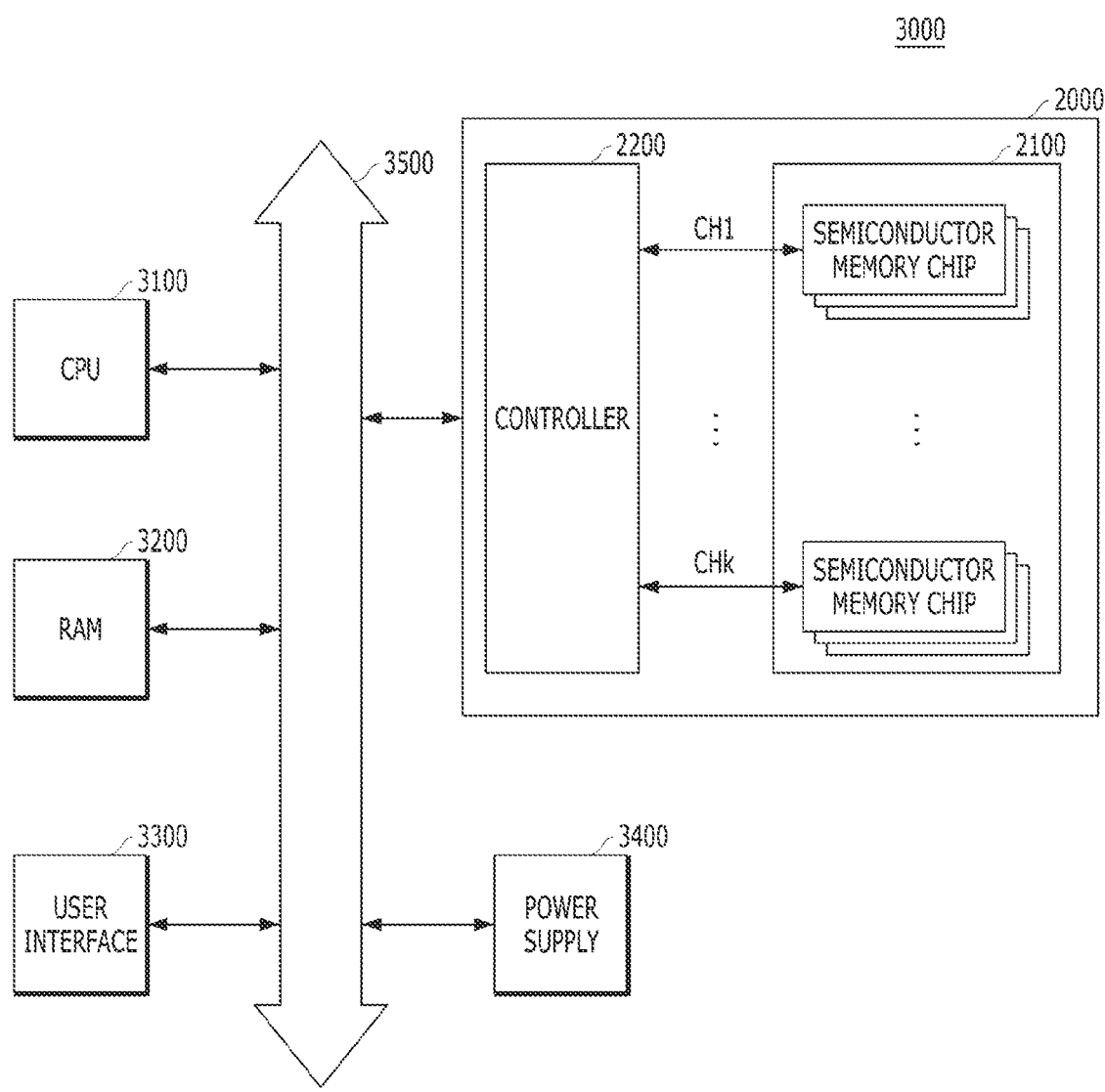
FIG. 15 is a block diagram illustrating a computing system including the memory system described with reference to FIG. 14.

FIG. 15 is a block diagram illustrating a computing system 3000 including the memory system 2000 shown in FIG. 14.

Referring to FIG. 15, the computing system 3000 may include a central processing unit (CPU) 3100, random access memory (RAM) 3200, a user interface 3300, a power supply 3400, a system bus 3500 and the memory system 2000.

The memory system 2000 may be electrically coupled to the central processing unit 3100, the RAM 3200, the user interface 3300 and the power supply 3400 through the system bus 3500. Data provided through the user interface 3300 or processed by the central processing unit 3100 may be stored in the memory system 2000.

FIG. 15 illustrates the semiconductor memory device 2100 coupled to the system bus 3500 through the controller 2200. However, the semiconductor memory device 2100 may be directly coupled to the system bus 3500. Functions of the controller 2200 may be performed by the central processing unit 3100 and the RAM 3200.

FIG. 15 illustrates the memory system 2000 described above with reference to FIG. 14. However, the memory system 2000 may be replaced by the memory system 1000 described above with reference to FIG. 14. In an embodiment, the computing system 3000 may include both memory systems 1000 and 2000 described above with reference to FIGS. 13 and 14, respectively.

As set forth above, according to the embodiments, the semiconductor memory device may improve yield by performing a block mapping operation for repairing the defective memory blocks among the guarantee blocks to the normal memory blocks.

According to the embodiments, the semiconductor memory may reduce the size of the repair mapping table by performing a block mapping operation using offset values. In addition, since the repair mapping information is not separately stored in the CAM block, the semiconductor memory may reduce the area occupied by the CAM block and reduce the time perform the CAM read operation.

According to the embodiments, the semiconductor memory may increase the number of user-valid blocks by cancelling the boundary between the normal and redundancy memory blocks.

It should be noted that although embodiments have been illustrated and described, the present embodiments are not limited to or by any of the disclosed embodiments. Those skilled in the art will recognize in light of the present disclosure that various changes may be made to any of the disclosed embodiments without departing from the technical spirit of the present disclosure. The present disclosure encompasses all changes that fall within the scope of the claims.

For example, the logic gates and transistors provided as examples herein, may be of a different type and arranged differently than disclosed herein depending on the polarity of the input signal.

What is claimed is:

1. A semiconductor memory device, comprising:
    a plurality of memory blocks including first to m-th guarantee blocks, wherein m is an integer greater than 1;
    repair logic circuit configured to generate bad block information by detecting defective memory blocks among the first to m-th guarantee blocks, determine first to m-th offset values respectively corresponding to the first to m-th guarantee blocks based on the bad block information, and configure fields of a repair mapping table by setting the first to m-th offset values respectively corresponding to the first to m-th guarantee blocks according to a determination result; and
    an address decoder circuit configured to generate a block selection address by reflecting an offset value selected from the first to m-th offset values onto a block address when the block address corresponds to any of the first to m-th guarantee blocks, and by reflecting the m-th offset value onto the block address when the block address corresponds to any of the memory blocks except for the first to m-th guarantee blocks,
    wherein the plurality of memory blocks include:
        a plurality of normal memory blocks including the first to m-th guarantee blocks; and
        a plurality of extension memory blocks extendable to the normal memory blocks according to the first to m-th offset values, and
    wherein setting first to m-th offset values respectively corresponding to the first to m-th guarantee blocks includes:
        initializing a block index signal, a bad block count signal, and a field index signal;
        determining whether a normal memory block corresponding to the block index signal, among the normal memory blocks, is a bad block based on the bad block information;
        assigning the bad block count signal to the offset value which is designated by the field index signal, among the first to m-th offset values, and increasing the field index signal, according to a determination result;
        increasing the block index signal; and
        repeatedly performing operations of initializing, determining, assigning, and increasing until the field index signal reaches a maximum value.

2. The semiconductor memory device of claim 1, wherein the normal memory blocks and the extension memory blocks are accessed by an external device using the block address.

3. The semiconductor memory device of claim 1, wherein at least one of the first to m-th guarantee blocks includes a content addressable memory CAM block, and
    the CAM block stores the bad block information.

4. The semiconductor memory device of claim 3, wherein the repair logic circuit includes:
    a bad block scan circuit configured to scan the bad block information from the CAM block during a power-up operation;
    an offset calculation circuit configured to determine whether any of the first to m-th guarantee blocks is defective, based on the bad block information, to set the first to m-th offset values; and a repair mapping table circuit configured to store the first to m-th offset values as fields for indexes of a repair mapping table.

5. The semiconductor memory device of claim 4, wherein a bit width of each field of the repair mapping table is determined according to the number of the first to m-th guarantee blocks.

6. The semiconductor memory device of claim 4, wherein the offset calculation circuit calculates the first to m-th offset values by accumulatively counting the number of defective memory blocks among the first to m-th guarantee blocks.

7. The semiconductor memory device of claim 1, wherein the address decoder circuit includes:
   a block decoder circuit configured to decode the block address to generate a first preliminary address when the block address corresponds to any of the first to m-th guarantee blocks, and generate a second preliminary address when the block address corresponds to any of the memory blocks except for the first to m-th guarantee blocks;
   a first offset reflector circuit configured to receive the first preliminary address, and generate the block selection address by adding the offset value selected from the first to m-th offset values to the first preliminary address; and
   a second offset reflector circuit configured to receive the second preliminary address, and generate the block selection address by adding the m-th offset value to the second preliminary address.

8. A memory system, comprising:
   a memory device including a plurality of memory blocks including first to m-th guarantee blocks, wherein m is an integer greater than 1; and
   a controller suitable for providing an address including a block address, a command, and data to the memory device,
   wherein the memory device generates bad block information by detecting defective memory blocks among the first to m-th guarantee blocks, determines first to m-th offset values respectively corresponding to the first to m-th guarantee blocks based on the bad block information, configures fields of a repair mapping table by setting the first to m-th offset values respectively corresponding to the first to m-th guarantee blocks according to a determination result, and generates a block selection address by reflecting an offset value selected from the first to m-th offset values onto a block address when the block address corresponds to any of the first to m-th guarantee blocks, and by reflecting the m-th offset value onto the block address when the block address corresponds to any of the memory blocks except for the first to m-th guarantee blocks,
   wherein the memory blocks include:
      a plurality of normal memory blocks including the first to m-th guarantee blocks; and
      a plurality of extension memory blocks extendable to the normal memory blocks according to the first to m-th offset values, and
   wherein setting first to m-th offset values respectively corresponding to the first to m-th guarantee blocks includes:
      initializing a block index signal, a bad block count signal, and a field index signal;
      determining whether a normal memory block corresponding to the block index signal, among the normal memory blocks, is a bad block based on the bad block information;
      assigning the bad block count signal to the offset value which is designated by the field index signal, among the first to m-th offset values, and increasing the field index signal, according to a determination result;
      increasing the block index signal; and
      repeatedly performing operations of initializing, determining, assigning, and increasing until the field index signal reaches a maximum value.

9. The memory system of claim 8, wherein the normal memory blocks and the extension memory blocks are accessed by an external device using the block address.

10. The memory system of claim 8, wherein the memory device includes:
   an offset calculation circuit configured to determine whether any of the first to m-th guarantee blocks is defective, based on the bad block information, to set the first to m-th offset values;
   a repair mapping table circuit configured to store the first to m-th offset values as fields for indexes of a repair mapping table;
   a block decoder circuit configured to decode the block address to generate a first preliminary address when the block address corresponds to any of the first to m-th guarantee blocks, and generate a second preliminary address when the block address corresponds to any of the memory blocks except for the first to m-th guarantee blocks;
   a first offset reflector circuit configured to receive the first preliminary address, and generate the block selection address by adding the offset value selected from the first to m-th offset values to the first preliminary address; and
   a second offset reflector circuit configured to receive the second preliminary address, and generate the block selection address by adding the m-th offset value to the second preliminary address.

11. The memory system of claim 10, wherein a bit width of each field of the repair mapping table is determined according to the number of the first to m-th guarantee blocks.

12. An operating method of a semiconductor memory device including a plurality of memory blocks including first to m-th guarantee blocks, wherein m is an integer greater than 1, the method comprising:
   determining whether any of the first to m-th guarantee blocks is defective, based on bad block information, and configuring fields of a repair mapping table by setting first to m-th offset values respectively corresponding to the first to m-th guarantee blocks according to a determination result;
   generating a block selection address according to an offset value selected from the first to m-th offset values by determining whether a block address corresponds to any of the first to m-th guarantee blocks;
   selecting a memory block corresponding to the block selection address, from the plurality of memory blocks, and assigning one of the first to m-th offset values to each of the plurality of memory blocks,
   wherein the plurality of memory blocks include:
      a plurality of normal memory blocks including the first to m-th guarantee blocks; and
      a plurality of extension memory blocks extendable to the normal memory blocks according to the first to m-th offset values, and
   wherein the setting first to m-th offset values respectively corresponding to the first to m-th guarantee blocks includes:

initializing a block index signal, a bad block count signal, and a field index signal;

determining whether a normal memory block corresponding to the block index signal, among the normal memory blocks, is a bad block based on the bad block information;

assigning the bad block count signal to an offset value which is designated by the field index signal, among the first to m-th offset values, and increasing the field index signal, according to a determination result;

increasing the block index signal; and repeatedly performing operations of initializing, determining, assigning, and increasing until the field index signal reaches a maximum value.

13. The operating method of claim 12, wherein the normal memory blocks and the extension memory blocks are accessed by an external device using the block address.

14. The operating method of claim 12, further comprising:

storing the bad block information of repair information in a content addressable memory CAM block, by a test operation; and scanning the bad block information from the CAM block, by a CAM read operation during a power-up operation.

15. The operating method of claim 12, wherein when the normal memory block corresponding to the block index signal is not the bad block, assigning the bad block count signal to the offset value which is designated by the field index signal, and increasing the field index signal, and when the normal memory block corresponding to the block index signal is the bad block, increasing the bad block count signal.

16. The operating method of claim 12, wherein the generating a block selection address according to an offset value includes:

when the block address corresponds to any of the first to m-th guarantee blocks, generating the block selection address according to the offset value selected from the first to m-th offset values, and when the block address corresponds to any of the memory blocks except for the first to m-th guarantee blocks, generating the block selection address according to the m-th offset value.

* * * * *